(12) United States Patent
Gatzke

(10) Patent No.: US 6,558,329 B1
(45) Date of Patent: May 6, 2003

(54) MEDICAL ULTRASOUND RECEIVE ARCHITECTURE

(75) Inventor: Ronald Dennis Gatzke, Lexington, MA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/562,234

(22) Filed: Apr. 28, 2000

(51) Int. Cl.[7] ................................................. A61B 8/14
(52) U.S. Cl. ........................ 600/457; 600/437; 600/453; 600/455
(58) Field of Search ................................ 600/443, 453, 600/454, 447, 457, 455

(56) References Cited

U.S. PATENT DOCUMENTS

| 4,759,373 | A | * | 7/1988 | Takeuchi | 600/455 |
| 5,005,419 | A | * | 4/1991 | O'Donnell et al. | 73/626 |
| 5,482,044 | A | * | 1/1996 | Lin et al. | 600/453 |
| 5,657,760 | A | * | 8/1997 | Ying et al. | 600/439 |
| 6,042,547 | A | * | 3/2000 | Wright et al. | 600/447 |
| 6,086,539 | A | * | 7/2000 | Guracar et al. | 600/453 |
| 6,309,356 | B1 | * | 10/2001 | Ustuner et al. | 600/443 |

OTHER PUBLICATIONS

H.B. Crawley, R. McKay, W.T. Meyer, E.I. Rosenberg, and W.D. Thomas, Testing ADC's At Sample Rates From 20 to 120 MSPS, IEEE Transactions on Nuclear Science, vol. 40, No. 4, Aug. 1993, p. 729–732.*

* cited by examiner

*Primary Examiner*—Francis J. Jaworski
*Assistant Examiner*—William C. Jung
(74) *Attorney, Agent, or Firm*—John Vodopia

(57) ABSTRACT

An ultrasound system that performs image processing in the digital domain, including CW Doppler. The ultrasound system is provided with a transducer having a plurality of elements and an ultrasound receiver with a plurality of channels. Each channel receives an analog echo signal and outputs a digital representation of the analog echo signal using an A/D converter capable of converting a signal with a dynamic range of at least 154 dB.

20 Claims, 2 Drawing Sheets

MEDICAL ULTRASOUND RECEIVE ARCHITECTURE

BACKGROUND OF THE INVENTION

The present invention relates to methods and apparatus which process data received from an ultrasound transducer in preparation for subsequent signal processing, such as, modulation recovery and scan conversion. More particularly, the present invention provides a single path for processing of data received from an ultrasound transducer, entirely in the digital domain, with an improved dynamic range.

FIG. 1 is a block diagram of an ultrasound system 100. A transmit waveform generator 110 is coupled through a transmit/receive (T/R) switch 112 to a transducer array 114, which includes an array of transducer elements. The T/R switch 112 typically has one switch element for each transducer element. The transmit waveform generator 110 receives transmit pulse timing sequences from a waveform timing generator 116. The transducer array 114, energized by the transmit waveform generator 110, transmits ultrasound energy into a region of interest in a patient's body and receives reflected ultrasound energy, or echoes, from various structures and organs within the patient's body. As is known in the art, by appropriately delaying the pulses applied to each transducer element by the transmit waveform generator 110, a steered and focused ultrasound beam is transmitted.

The transducer array 114 is coupled through the T/R switch 112 to a receive waveform generator 118. Ultrasound echoes from a given point within the patient's body are received by the transducer elements at different times. The transducer elements convert the received ultrasound echoes to transducer signals which may be amplified, individually delayed and then summed by the receive waveform generator 118 to provide a waveform generator signal that represents the received ultrasound level along a desired receive line. The echoes exhibit a wide dynamic range of approximately 160 dB. Echoes from objects close to the transducer can produce a signal of 200 millivolts from the transducer, while echoes farther away from the transducer can produce a signal having an amplitude eight (8) orders of magnitude less. Any echo that cannot produce at least a 2 nano-volt response in the transducer array 114 can be lost in the noise.

The waveform generator signals are applied to a signal processor 124 which digitally processes the waveform generator signal for improved image quality and to perform such processing as color flow processing. As known in the art, the delays applied to the transducer signals may be varied during reception of ultrasound energy to effect dynamic focusing. The receive waveform generator 118 and the signal processor 124 form an ultrasound receiver 126. The output of the signal processor 124 is supplied to a scan converter 128 which converts sector scan or other scan pattern signals to conventional raster scan display signals. The output of the scan converter 128 is supplied to a display unit 130, which displays an image of the region of interest in the patient's body. In the case of a three-dimensional scan pattern, the scan converter 128 may be replaced by an image data buffer that stores the three-dimensional data set and a processor that converts the three-dimensional data set to a desired two-dimensional image.

A system controller 132 provides overall control of the system, including timing control. The system controller 132 typically includes a microprocessor operating under the control of control routines 134 stored in a memory 136. The system controller also utilizes the memory 136 to store intermediate values, including system variables describing the operation of the ultrasound imaging system 100. An external storage 138, for example a floppy disk drive, a CD-ROM drive, a videotape unit, etc . . . , may be utilized for more permanent and/or transportable storage of data.

FIG. 2 is a block diagram of a single channel in a known ultrasound receiver. The ultrasound receiver shown herein is limited to a single receive channel so as to simplify explanation of the circuit. The elements within the dotted lines are repeated for each channel of the waveform generator, while the elements outside the dotted lines are global, serving the entire circuit.

Block 200 contains a representation of a signal produced by an element of a transducer array 114 (FIG. 1). Basically, the signal from each element can be represented as a source voltage 210 (Es) having a resistance 212 (Rs) and a noise component 214 ($e_n$). The signal is fed into a beamforming channel 205. As noted above, each element of the transducer array 114 typically (but not necessarily) has a corresponding beamforming channel 205.

The signal from each element is first amplified by amplifier 216 to bring the signal level up to an appropriate value. Subsequently, the signal is processed on two paths, one for digital processing (the "digital path," elements 218–226) and one for analog processing (the "analog path," elements 232 and 234).

Looking at the digital path, the signal 200 is first applied to a filter 218, such as a harmonic filter or clipping filter. Filter 218 acts on the entire dynamic range of the signal 200 and prepares the signal for subsequent processing. In the case of the harmonic filter, echoes exhibiting a harmonic frequency of the fundamental transmitted frequency are extracted (or allowed to pass). The resultant signal is processed using so called "harmonic processing."

The output of the filter 218 is applied to a variable gain amplifier 220, which, in effect provides a window into the dynamic range of the signal 200. In other words, the variable gain amplifier selects a portion of the dynamic range for subsequent processing. The portion of the signal 200 selected is varied based on the type of A/D converter used (121 dB wide for an 8 bit A/D converter and 133 dB wide for a 10 bit A/D converter at 40 MSPS sample rates) and the subsequent image processing to be applied to the signal 200.

The digital processing path utilizes a pulse mode (as opposed to a continuous mode discussed hereinafter) in which pulses are transmitted, received, and processed on a cyclical basis. Most types of processing in this mode use a focused ultrasound signal. Areas outside the focus can be ignored, thereby limited the dynamic range of signals that need to be analyzed. The variable gain amplifier 220 limits the signal 200 to a defined dynamic range, without unacceptably affecting the resultant image.

The output of the variable gain amplifier 220 is filtered by a Nyquist filter 222 (in effect a low pass filter) to remove frequencies that can't be sampled by the A/D converter 224. The highest frequency which can be accurately represented is one half of the sampling rate. Therefore, the Nyquist filter 222 is selected to match A/D converter 224 which converts the output of the Nyquist filter 222 into the digital domain. Current ultrasound systems employ an 8-bit or 10-bit converter.

After being converted into a digital signal, the output of the transducer array is processed through beamform logic 226. Basically, the beamform logic 226 delays the digital output of each channel by a predetermined amount (based on the desired direction and focusing of the receive beam shape). One method of accomplishing this is to load the output into a register and after the predetermined time reading the register. Subsequently, the output of all of the channels are summed by summing logic 228.

Each transmit event on the transducer array 114 (FIG. 1) starts a receive, process, delay and sum cycle in the receive waveform generator 118. The resultant digital representation of the echo of each transmit event is submitted to digital processing 230, such as signal demodulation and scan conversion.

As noted above, certain types of processing are currently performed in the analog domain. Perhaps the best example is Continuous Wave Doppler processing (CW processing). Doppler processing, in general, seeks to determine the speed of blood flow through vessels. Currently there are two types of Doppler processing, Pulse Wave and Continuous Wave.

Pulse Wave Doppler processing employs the pulse mode scanning described above. Returning echoes are analyzed (using Doppler shift) to determine a speed of blood through the target vessel. This analysis is limited by the Pulse Repetition Frequency (PRF) of the ultrasound system. Because sound does not travel instantaneously, the repetition frequency of a transmitted pulse is limited by the amount of time it takes for each pulse to return. Another pulse typically cannot be transmitted until the echo of the prior pulse is received. The PRF for most ultrasound systems is approximately 8 KHz. As this technique is, in effect, a sampling technique, the Nyquist theorem applies, such that Pulse Wave Doppler techniques can only measure peak velocities for Doppler shifts up to one half of the PRF, in this case 4 KHz. This is generally adequate for normal blood flows, but some conditions lead to blood flows that create a frequency shift up to 20 KHz, requiring a PRF of 40 KHz. For some of these conditions the only medical measurement upon which a diagnosis can be comfortably predicated is the speed of blood flow.

CW processing was primarily created to measure high velocity blood flow. In CW processing, a transducer's elements are divided into two groups, a send group and a receive group. The send group of elements continuously transmit an ultrasound wave while the receive group continuously receive echoes. The Doppler shift of the received signal is measured and a velocity is determined. Of course, because echoes cannot be matched with transmissions, any idea of range (i.e. depth) is lost and the output is a simple velocity measurement. As depth is indeterminate, the 160 dB entire dynamic range of the return signal must be analyzed to find the greatest Doppler shift. The dynamic range significantly exceeds the dynamic range of 8-bit or 10-bit converters, 121 dB and 133 dB respectively. Accordingly, such analysis is performed in the analog domain.

In the analog path, each signal is first passed through an anti-alising filter 232 prior to being delayed by a phase delay circuit 234. The output of each element in the transducer array 114 is then summed by a summing circuit 236. Subsequently, the summed signal is submitted to analog processing 238, such as CW processing. The result of the analog processing 228 is subsequently A/D converted by an A/D converter 240 in preparation for digital processing 230, including scan conversion and display.

The phase delay circuit 234 generally comprises analog delay lines which are bulky and expensive. Current 1-D transducer arrays have 64 to 512 elements, while the new 2-D arrays for use with 3-D imaging have thousands of elements. Accordingly, the cost and size of the analog circuits will become an obstacle to 3-D processing in the analog domain. Further, it is inconvenient, and time consuming, to incorporate the analog data into a digital display. Accordingly, there exists a need for an ultrasound system that can perform beamforming and signal processing (including CW processing) entirely in the digital domain.

SUMMARY OF THE INVENTION

An ultrasound system is described that performs image processing, including CW Doppler, in the digital domain. The ultrasound system is provided with a transducer having a plurality of elements and an ultrasound receiver with a plurality of channels. Each channel receives an analog echo signal and outputs a digital representation of the analog echo signal using an A/D converter capable of converting a signal with a dynamic range of at least 160 dB at twice the Nyquist rate. As such an A/D converter can represent the entire useful dynamic range of an ultrasound echo signal, operations, previously performed in the analog domain, can be performed in the digital domain. These operations include filtering the data for harmonic signals and CW Doppler processing.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENT

Reference will now be made in detail to the present preferred embodiment of the present invention, an example of which is illustrated in the accompanying drawings. The present invention provides an improved ultrasound receiver for use in an ultrasound system. More importantly, the ultrasound receiver, as set forth herein, allows a single digital domain path to be constructed for the processing of data from an ultrasonic transducer. This single path simplifies and enhances the ultrasound system by providing a single data source for subsequent imaging processing.

Figure 1:
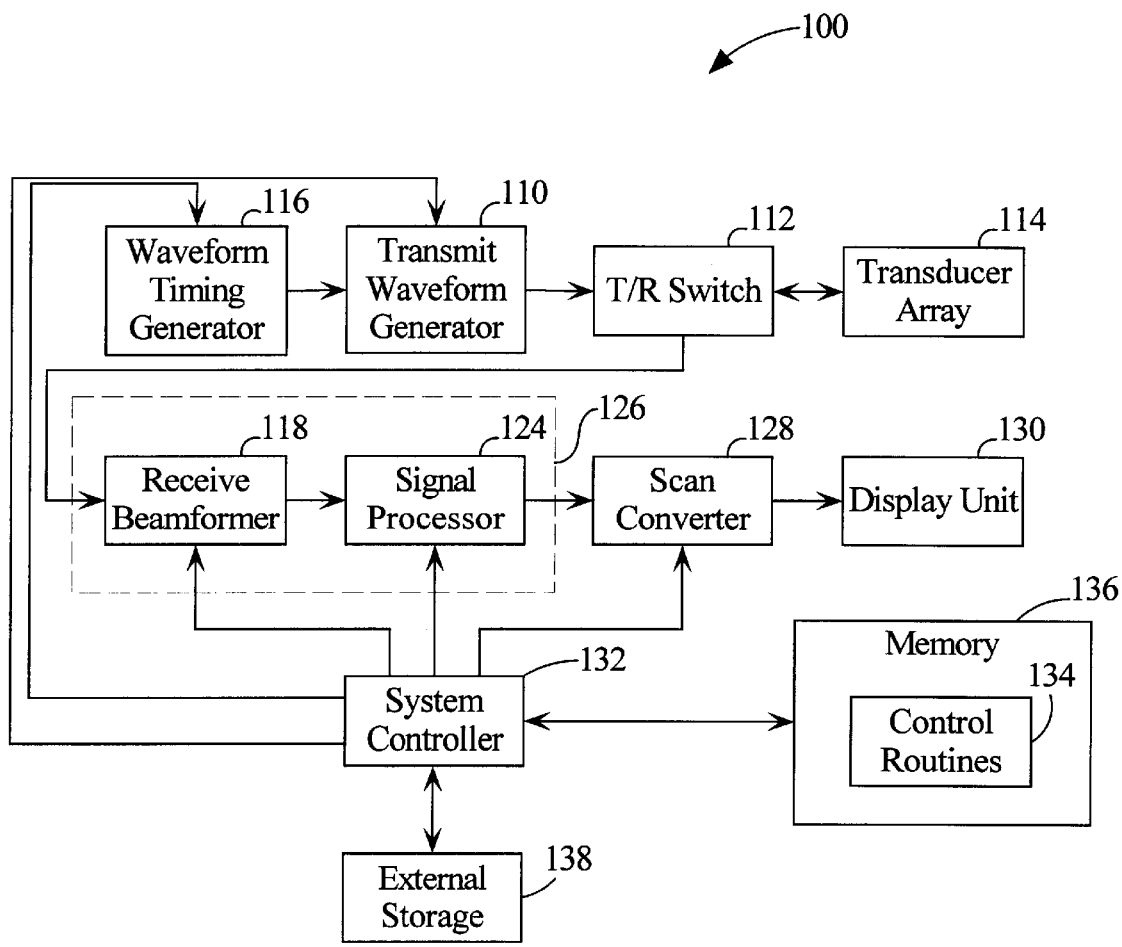
FIG. 1 is a block diagram of an ultrasound system.

The present invention provides an ultrasound receiver that can be practiced within the ultrasound receiver 126 (FIG. 1). It will be appreciated by those of ordinary skill in the relevant arts that the ultrasound imaging system 100, as illustrated in FIG. 1, and the operation thereof as described hereinafter is intended to be generally representative of such systems and that any particular system may differ significantly from that shown in FIG. 1, particularly in the details of construction and operation of such system. As such, the ultrasound imaging system 100 is to be regarded as illustrative and exemplary and not limiting as regards the invention described herein or the claims attached hereto.

Figure 3:
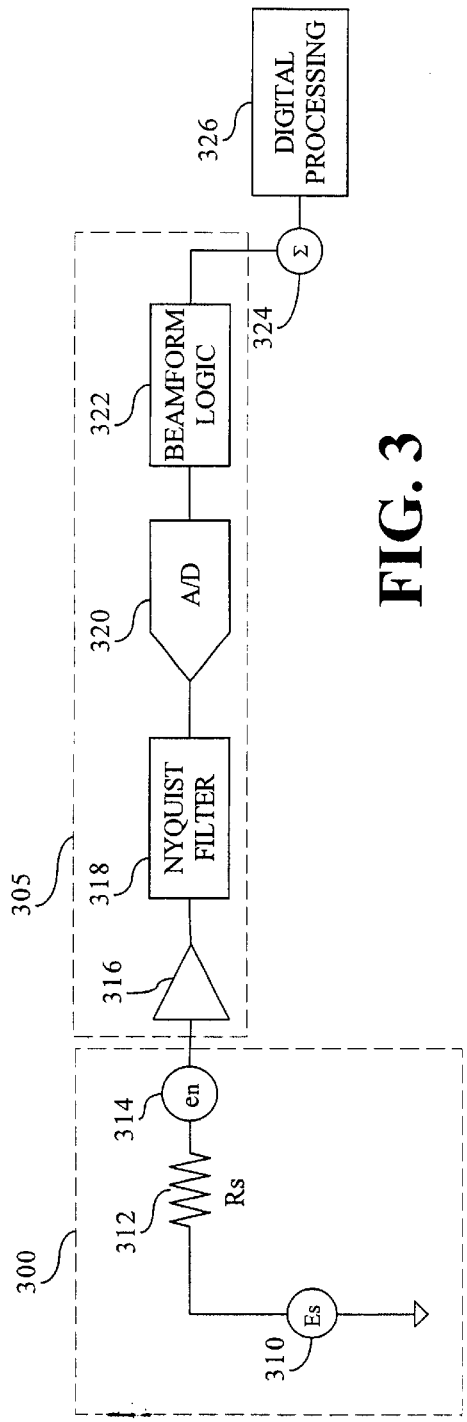
FIG. 3 is a block diagram of a single channel of an ultrasound receiver in accordance with the preferred embodiment of the present invention.

FIG. 3 is a block diagram of a single channel of an ultrasound receiver in accordance with the preferred embodiment of the present invention. The elements within the dotted lines are repeated for each channel of the waveform generator, while the elements outside the dotted lines are global, serving the entire circuit.

Block 300 contains a representation of a signal produced by an element of a transducer array 114 (FIG. 1). Basically, the signal from each element can be represented as a source voltage 310 (Es) having a resistance 312 (Rs) and a noise component 314 ($e_n$). The signal is fed into a beamforming element 305. As noted above, each channel of the transducer array 114 typically has a corresponding beamforming element 305.

The signal 300 is passed through an amplifier 316 that provides proper impedance loading for the transducer and amplifies the maximum input signal to match the maximum input signal of an A/D converter 320. The output of the amplifier 316 is passed through a Nyquist filter 318, which acts as a lowpass filter. Thereafter, the signal 300 is A/D converted by an A/D converter 320 ("ADC") which, at a minimum, provides a dynamic range of 160 dB. This can be accomplished by an A/D converter which converts 14.7 bits at 20 MSPS. An additional 6 dB in dynamic range is desirable to reduce A/D noise to a low level relative to the transducer input noise, and can be obtained with an ADC that converts 15.7 bits at 20 MSPS or 15.2 bits at 40 MSPS (6 dB of dynamic range is obtained for each bit and 3 dB for each doubling of the sampling rate). A/D converters exhibiting the desired dynamic range (160 dB utilizing 16 bit converters with sample rates of 40–65 MSPS) are currently under development by several manufacturers, including NATIONAL SEMICONDUCTOR CORP., ANALOG DEVICES INC., and MAXIM INTEGRATED PRODUCTS INC. The output of the A/D converter 320 is subjected to beamform logic 322, to introduce the appropriate delay, and is summed with the output of the other channels by summing process 324.

Figure 2:
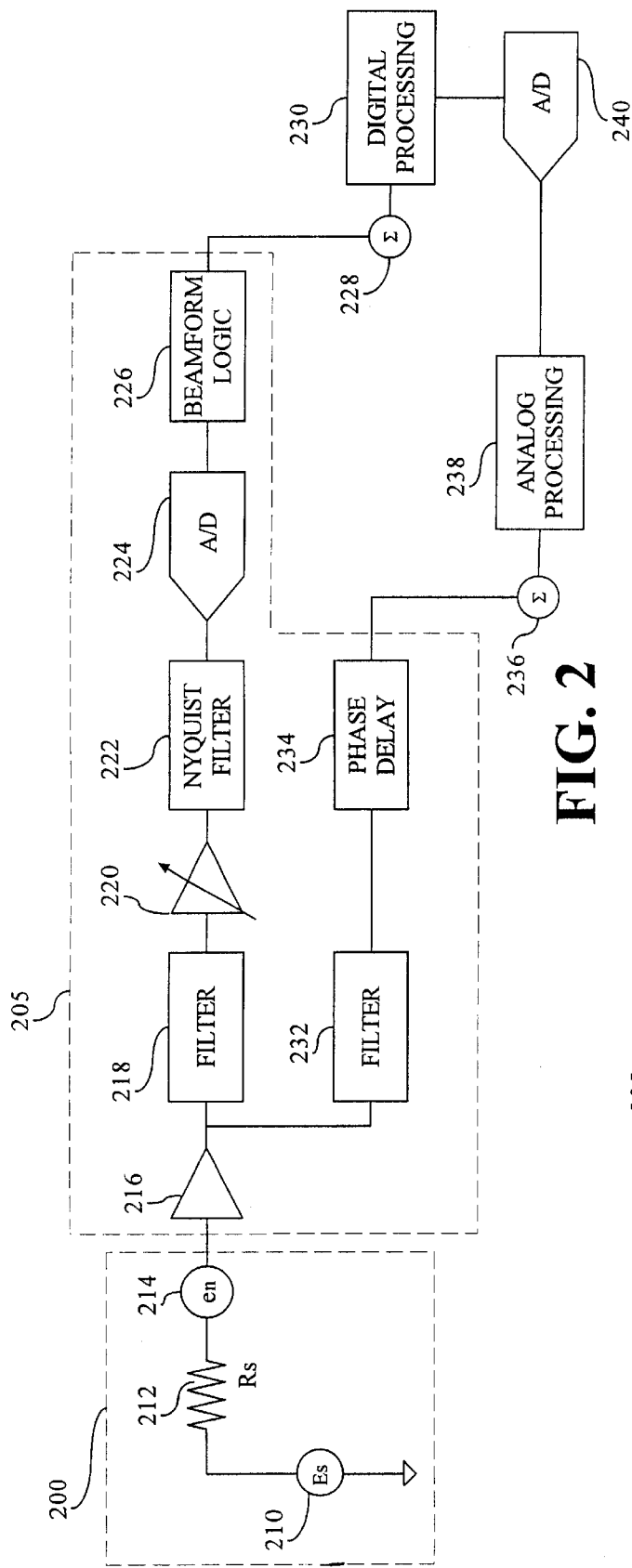
FIG. 2 is a block diagram of a single channel of a known ultrasound receiver.

As the output of the A/D converter 320 encompasses the entire useful dynamic range of an ultrasound echo signal, an adjustable gain amplifier 220 (FIG. 2) is no longer required. Further, as the entire signal can be digitized, most if not all, analog processing can be eliminated. Thus, the filter 218 can also be eliminated along with the entire analog path shown in FIG. 1 (anti-alising filter 232, phase delay circuit 234, summing circuit 236, analog processing 238, and A/D converter 240). The functions previously performed in the analog domain can now be performed in the digital domain. Accordingly, all of these functions are, if necessary, replicated using digital processing 326. The creation of such routines is within the ability of those of ordinary skill in the art, and the description thereof is omitted so as not to obscure the subject matter of the present invention.

In accordance with the foregoing, the present inventors have described an ultrasound receiver that produces a digital representation of a received ultrasound echo signal with a dynamic range that equals the useful dynamic range of the received ultrasound echo signal. This represents a significant advance over the prior art which uses a separate analog path for processes that require the full dynamic range to perform an analytical function.

Although a preferred embodiment of the present invention has been shown and described, it would be appreciated by those skilled in the art that changes may be made in this embodiment without departing from the principles and spirit of the invention, the scope of which is defined in the claims and their equivalents.

For example, the preferred embodiment is a high performance ultrasound imaging system. A system with reduced performance can still be clinically useful. Such a reduced performance system could have a maximum input signal of only 100 mv, with a 2 nv/Sqrt Hz noise level. This would yield a dynamic range of 154 dB. Such a system could be realized with a 13.7 bit converter at 20 MSPS and still reap the benefits of the described improved architecture.

It will be recognized that alternative A/D techniques can be used to achieve the desired dynamic range of greater than 154 dB or even the preferred range of greater than 160 dB. It is possible to operate an A/D converter of fewer bits at a higher sampling rate to achieve equivalent dynamic range. For example, a 9.7 bit A/D converter operated at 2500 MSPS would offer a 154 dB dynamic range. Another A/D technique which could be employed is Delta-Sigma technology which makes use of low bit count converters operated at a high sample rate with additional digital signal processing to achieve a desired dynamic range.

What is claimed is:

1. An ultrasound system comprising:
   a transducer having a plurality of transducer elements that convert acoustic energy into an electrical signal; and
   an ultrasound receiver, in communication with said transducer elements, having a plurality of channels, each of said channels receiving the electrical signal from a respective one of said transducer elements and outputting a digital representation of the electrical signal, each of said channels having an A/D converter capable of converting a signal with a dynamic range of at least 154 dB.

2. An ultrasound system, as set forth in claim 1, wherein each of said channels has an A/D converter capable of converting at least 14.7 bits at 40 MSPS.

3. An ultrasound system, as set forth in claim 1, wherein each of said channels has an A/D converter capable of converting a signal with a dynamic range of at least 160 dB.

4. An ultrasound system, as set forth in claim 1, further comprising:
   a processor that performs digital processing on the output of said ultrasound receiver, the digital processing including one of CW Doppler processing and harmonic signal processing.

5. An ultrasound system, as set forth in claim 1, wherein each of said channels in said ultrasound receiver comprises:
   a pre-amplifier that amplifies the output of said respective transducer element to match a maximum input signal level of said A/D converter in said channel;
   a Nyquist filter that filters the output of said pre-amplifier to remove frequencies that cannot be converted by said A/D converter in said channel; and
   beamforming logic that receives the output of said A/D converter in said channel and delays the output of said channel by a predetermined value.

6. An ultrasound system, as set forth in claim 1, further comprising:
   summing logic that sums the output of each of said channels.

7. An ultrasound system as set forth in claim 1, wherein each of said transducer elements directs the signal only to the respective one of said channels such that the signal from each of said transducer elements is only subject to digital processing in said respective channel.

8. An ultrasound system as set forth in claim 1, wherein each of said channels in said ultrasound receiver further comprises:
   a pre-amplifier that amplifies the output of said respective transducer element to match a maximum input signal level of said A/D converter in said channel; and
   a Nyquist filter arranged directly after said pre-amplifier to receive the output of said pre-amplifier directly from said pre-amplifier and filter the output of said pre-amplifier to remove frequencies that cannot be converted by said A/D converter in said channel.

9. An ultrasound system as set forth in claim 8, wherein the output from said pre-amplifier is directed only to said Nyquist filter.

10. An ultrasound system as set forth in claim 1, wherein said ultrasound receiver consists of said channels such that analog processing of the signals from said transducer elements is not performed in said ultrasound receiver.

11. A method of processing echoes received by a plurality of elements of a transducer, the method comprising the steps of:

directing the echoes from each transducer element into a respective one of a plurality of separate processing paths; and digitizing the echoes in each of the processing paths to produce a digital signal with a dynamic range of at least 160 dB.

12. A method as set forth in claim 11, further comprising the step of:

digitally processing the digital signals to perform at least one of CW Doppler processing and harmonic signal processing.

13. A method as set forth in claim 11, further comprising the steps of:

summing the digital signals from each processing path; and subjecting the summed signal to digital processing.

14. A method as set forth in claim 11, further comprising the step of:

delaying the output of the digital signal from each processing path independent of the delay in the output of digital signals from other processing paths.

15. An ultrasound system comprising:

a transducer having a plurality of elements that convert acoustic energy into an electrical signal; and an ultrasound receiver, in communication with said transducer elements, having a plurality of channels, each of said channels receiving the electrical signal from a respective one of said transducer elements and outputting a digital representation of the electrical signal, each of said channels having an A/D converter capable of digitizing the electrical signal with a dynamic range of at least 160 dB.

16. An ultrasound system as set forth in claim 15, wherein each of said transducer elements directs the signal only to the respective one of said channels such that the signal from each of said transducer elements is only subject to digital processing in said respective channel.

17. An ultrasound system as set forth in claim 15, wherein each of said channels in said ultrasound receiver further comprises:

a pre-amplifier that amplifies the output of said respective transducer element to match a maximum input signal level of said A/D converter in said channel; and a Nyquist filter arranged directly after said pre-amplifier to receive the output of said pre-amplifier directly from said pre-amplifier and filter the output of said pre-amplifier to remove frequencies that cannot be converted by said A/D converter in said channel.

18. An ultrasound system as set forth in claim 17, wherein the output from said pre-amplifier is directed only to said Nyquist filter.

19. An ultrasound system as set forth in claim 15, wherein said ultrasound receiver consists of said channels such that analog processing of the signals from said transducer elements is not performed in said ultrasound receiver.

20. A method of processing echoes received by a plurality of elements of a transducer, the method comprising the steps of:

directing the echoes from each transducer element into a respective one of a plurality of separate processing paths;

digitizing the echoes from each transducer element to produce a digital signal with a dynamic range of at least 154 dB; and performing at least one of CW Doppler processing and harmonic signal processing on the digital signals in an entirely digital domain.

* * * * *